Jan. 15, 1946.  W. SCHAELCHLIN  2,393,071
MOUNTING FOR ELECTRICAL APPARATUS
Filed May 3, 1941  3 Sheets-Sheet 1
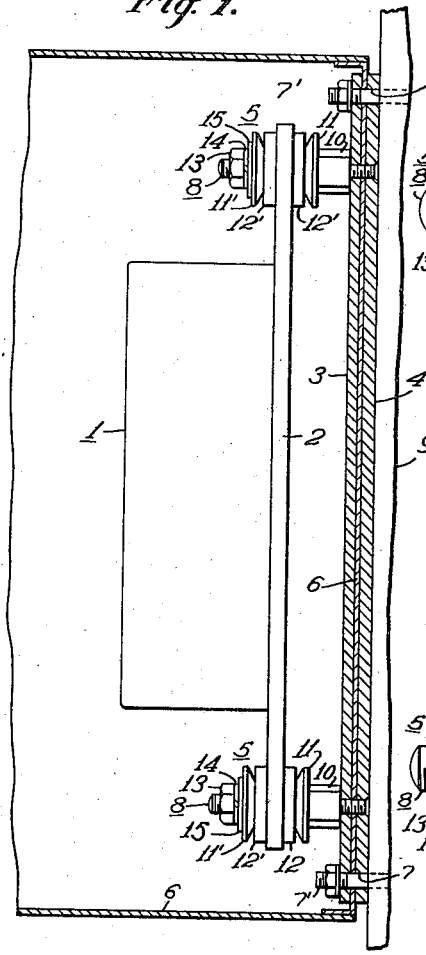
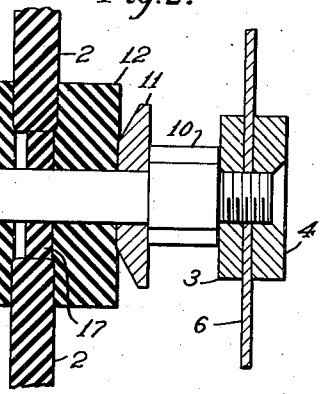
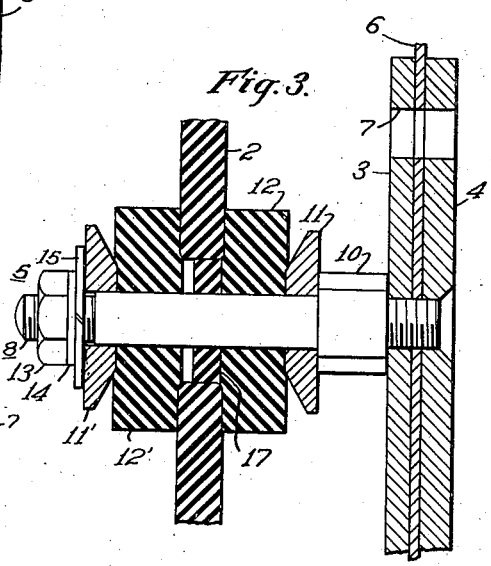
WITNESSES:
INVENTOR
Walter Schaelchlin.
BY
ATTORNEY Jan. 15, 1946.  W. SCHAELCHLIN  2,393,071
MOUNTING FOR ELECTRICAL APPARATUS
Filed May 3, 1941  3 Sheets-Sheet 2

WITNESSES:
Edward Michaels
Wm. J. Ruano

INVENTOR
Walter Schaelchlin.
BY
W. R. Coley
ATTORNEY

Jan. 15, 1946.   W. SCHAELCHLIN   2,393,071
MOUNTING FOR ELECTRICAL APPARATUS
Filed May 3, 1941   3 Sheets-Sheet 3

WITNESSES:
Edward Michaels
Wm. J. Ruano

INVENTOR
Walter Schaelchlin
BY
W. R. Coley
ATTORNEY

Patented Jan. 15, 1946

2,393,071

UNITED STATES PATENT OFFICE 2,393,071

MOUNTING FOR ELECTRICAL APPARATUS

Walter Schaelchlin, Forest Hills, Pa., assignor to Westinghouse Electric Corporation, East Pittsburgh, Pa., a corporation of Pennsylvania Application May 3, 1941, Serial No. 391,663

7 Claims. (Cl. 248—358)

My invention relates to supports for devices that are to be protected from shocks that may be imparted to a base, as a bulkhead of a ship.

On board war crafts as destroyers, battle ships, armored trains, tanks, etc., many devices essential to the operation and control of the craft, or essential to the operation and control of equipment on the craft, must be protected against shocks so that there may be no interference with the operation of either the craft or any of the equipment on the craft.

The gunfire of a war craft produces severe shocks and if the war craft is hit, still more severe shocks and vibrations are imparted to the craft. During all such shocks, the craft and the equipment must, if at all possible, remain intact.

An object of my invention is to reduce the vibration of a piece of apparatus, mounted on a vibrating base, to a minimum.

Another object of my invention is to prevent concurrent and equal acceleration of a device mounted on a support, or base and the base or support.

Other objects and advantages of my invention will become more apparent from a study of the following specification and the accompanying drawings, in which:

Figure 1 is a side view, with the nearest side wall broken away, of a cabinet showing schematically electrical equipment mounted on my special shock-reducing mounting construction;

Fig. 2 is a horizontal axial sectional view of my device;

Fig. 3 is a vertical axial sectional view of my device;

Figure 4:
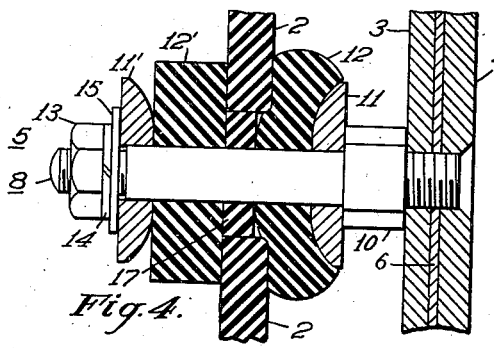
Figs. 4 and 5 illustrate two operating positions of my device.

Experience gained by the British during the present war indicates that the shock due to bomb explosions and some shell fire is equivalent to an impact of approximately 2000 pounds feet, or about fifteen times as much as heretofore specified by the Bureau of Ships for control apparatus. The Navy, therefore, now specifies that all control apparatus, as electrical controllers, electromagnetic contactors, etc., withstand this increased impact without causing destruction of the apparatus.

To make a sensitive relay or other delicate control apparatus rugged enough to meet this increased impact would be difficult, expensive and time consuming. I, therefore, devised a novel, useful, and reliable resilient mounting for the control panel adapted to carry electrical control apparatus or other devices. My device has been subjected to suitable tests by the War Department and has been found to be highly satisfactory.

(The test: My device was mounted on one side of twelve-inch armor plate and carried conventional electromagnetic contactors having insulating material of ceramic material. The reverse side of the armor plate was then subjected to gunfire from eight-inch guns. After the tests all devices carried by my support were intact and as good as before the tests.)

In Fig. 1, the device 1, as an electromagnetic contactor, is rigidly mounted on the panelboard 2. This panelboard is preferably made of some phenolic condensation product, as for instance material sold under the trade name of Micarta.

The panelboard 2 is held to the two straps 3 and 4 by four units of my novel resilient mounting device 5. The housing 6 has two straps 3 welded to the inner back wall and has two straps 4 welded, in line with straps 3, to the outer back surface. The two pairs of straps form a rigid construction for holding the housing 6, and the housing itself is entirely free from the weight of the panel and the devices on the panel.

The ends of the straps 3 and 4 are provided with holes 7 disposed as nearly as practicable in line with the bolts or studs 8 of my resilient support to thus keep the deflections, caused by any bending stresses in the straps, down to a minimum. That is, the bolts 8 will thus be subjected substantially to the same vibrations as are present in the main base 9, to which straps 3 and 4 are secured by bolts 7'. This main base may be the bulkhead of a war ship or any other war craft or other body subject to shocks.

Referring to Figs. 2, 3, 4 and 5, it will be noted that the bolt or stud 8 is rigidly screw-threaded into the straps 3 and 4 and the back wall of housing 6. The bolt 8 has an enlarged, preferably hexagonal sided, portion 10 which abuts at one end against strap 3. At the other end of the enlarged portion 10, a washer is disposed about the bolt to abut against the enlarged portion. This washer 11 is generally of the shape of a frustum of a relatively flat cone but can have other similar shapes. For instance, the washer may be in the shape of a section of a sphere or other dome shape.

A fairly soft rubber-like washer 12 fits over the bolt adjacent the point portion, or portion having the smaller outside diameter, of washer 11. The washers 11 and 11' may be made of natural rubber or made of any one of a number of synthetic rubbers, as Buna, and resins having the desired characteristics.

The projecting threaded end of bolt 8 is provided with a nut 13, a lock washer 14, a plain washer 15, and a pair of washers 11' and 12' similar in structure, mounting, and function, to the washers 11 and 12.

The panel is provided with a hole considerably larger in diameter than the diameter of the bolt 8 and disposed in the hole, and between washers 12 and 12' a rubber washer 17 is disposed on bolt 8. The washer 17 is of a lesser axial thickness than the thickness of the panel.

When the bulkhead is subjected to an impact, the shock is prevented from passing to the apparatus 1 by my construction. If the impact is from right to left, then the bolt 8 will move from right to left relative to the panel 2. This is illustrated in Fig. 4. Since the panel is not in line with the point portion of the washer 11, the washer will at first act like a very soft spring and as the distortion becomes greater radially and axially, the spring effect rises.

The conical or dome-shaped washer 11 coacting with the panel having a hole larger in diameter than the inside diameter of the washers 11 and 12 produces a complex action on the washer 12. There will be an action radially of the ring or washer 12, tending to increase its radius of gyration, there will be action in the axial direction of the washer 12 tending to decrease its axial thickness, and there will be a vortex action tending to rotate the ring about a circumference falling entirely within the body of the ring. This circumference may probably more accurately be called the path described by the end of the radius of gyration. There will also be frictional resistance at the regions of contact between the washers 11 and 12 and the panel and washer 12. This frictional resistance is an excellent damping feature. Further, rubber and rubber-like materials possess inherent damping characteristics. There may be still other factors that enter into the function of my device.

Figure 6:
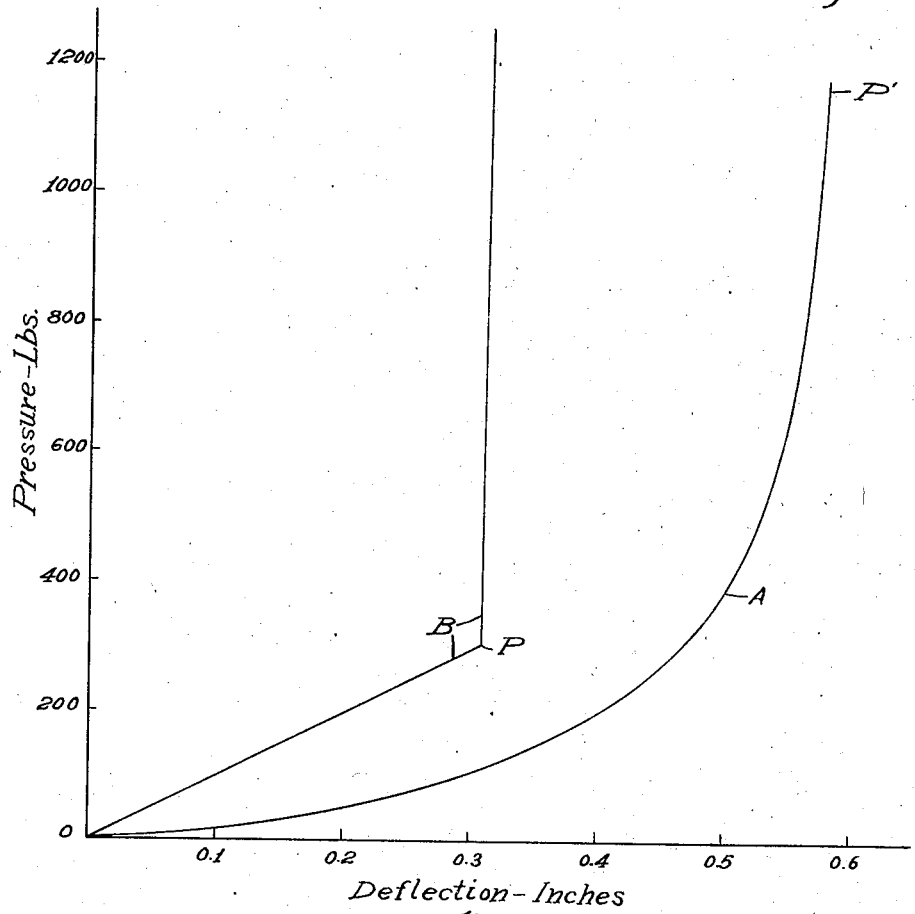
Figs. 6, 7 and 8 show curves illustrating the operating characteristics of my device.

In Fig. 6, I show the distortion that takes place. The resulting resilient reaction in relation to the impact forces is illustrated by the curves. It will be noted that curve A is not a straight line but is a curve showing a gradually changing rise in force transmitted to the panel 2.

It is well known that a flat piece of rubber disposed between two flat solid surfaces moving toward each other will produce a substantially linear reaction, as shown in curve B from points O to P, until a critical compression is attained, as at point P, at which point the flat piece of rubber will act like a rigid solid and the reaction force becomes equal to the force acting to move the flat solid surfaces toward each other, as illustrated by the substantially vertical portions of curve B. No such reaction is obtained with my arrangement. Since the curve A represents the force transmitted to the panel, it is apparent that the vibration of the apparatus on the panel is a function of curve C' and not curve A.

The curve A represents a curve, as determined from tests, of a relatively small unit of my device. For washers as 12 and 12' of the same dimensions used to determine the curve A, but where the washers 11 are flat and the panel 2 fits close about bolt 8, the washers, as 12, become completely compressed much sooner, that is, point P will be very much more to the left of point P'. See Fig. 6.

Figure 7:
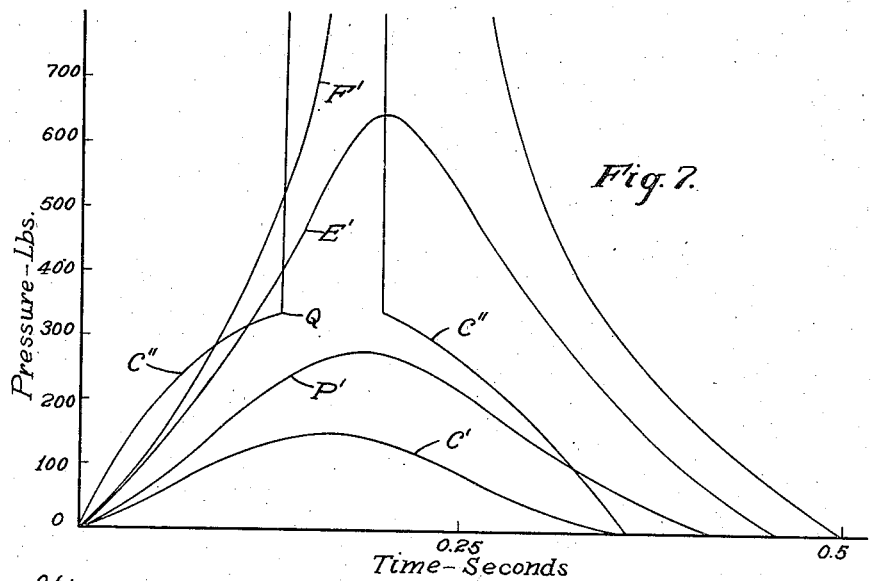
Figure 8:
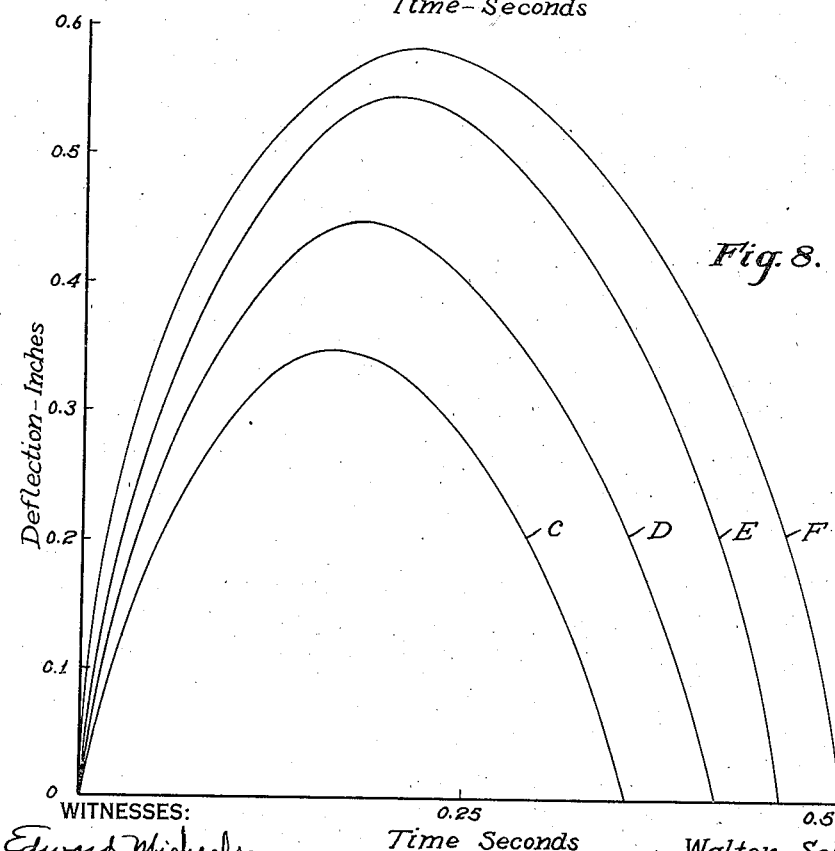

If the base 9, because of a bomb hit of the ship, is deflected in relation to time as shown by curve C, Fig. 8, then, using curves A, Fig. 6, and C, Fig. 8, to solve for the motion of the panel 2, it can be shown that the panel movement will be well dampened and that its movement will be as shown by curve C' in Fig. 7. On the other hand, if curves C and B are used to solve for the panel movement, then the panel 2 will move as shown by curve C'', Fig. 7. From curve C'' it is apparent the effect on panel 2 is very undesirable and may be worse than if no damping had been attempted. This is apparent from the abrupt change, at point Q, that takes place in the panel movement. For any movements of base 9 greater than indicated by curve C, as curves D, E and F, the effect on panel 2 becomes progressively worse. With my device the effect on panel 2 is as shown by curves D', E' and F', which correspond to curves D, E and F, respectively.

It will be noted that if the impact is great enough that even with my device the panel movement eventually partakes of the movement of the base 30, at no time is there an abrupt transition, as shown by point Q on curve C''.

Figure 5:
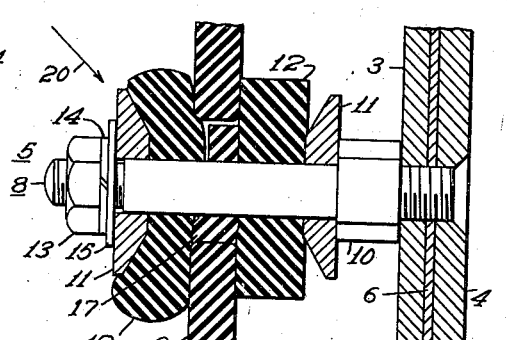

If the impact force is in a directly opposite sense, then the washer or ring 11' will be distorted as shown in Fig. 5. The theory of operation is the same as just explained.

When the impact is in the direction shown by arrow 20, Fig. 5, then washer 17 and washer 11' will be distorted as shown in Fig. 5. The component of impact forces in the plane of the panel are not of the same magnitude as those at right angles to the plane of the panel. The washer 17 will thus suffice.

I am, of course, aware that others, particularly after having had the benefit of the teachings of my invention, may devise other similarly functioning arrangements to accomplish the novel results herein specified. I, therefore, do not wish to be limited to the exact showing but wish to be limited only by the claims hereto appended.

I claim as my invention:

1. A support for a device that is to be protected against shocks, or impacts, imparted to the base upon which the support is mounted, in combination, a base, a stud having a conical ledge secured to the base and projecting at an angle from the base, a rubber-like band surrounding the stud at the apex portion of the conical ledge, a bar for carrying the device to be protected loosely surrounding the stud and loosely attached to the stud, and a rubber-like spacer disposed about the stud and disposed within the portion of the bar loosely surrounding the stud, whereby any force acting to move the bar toward the base subjects the rubber-like band to a number of forces including forces to axially compress the band, circumferentially lengthen the band, and subject the band to a vortex type twisting action.

2. A support for a device that is to be protected against shocks, or impacts, imparted to the base upon which the support is mounted, in combination, a base, a stud, having a conical ledge, secured to the base and projecting at substantially a right angle from the base and disposed to have the base of the conical ledge adjacent the base, a relatively thick rubber washer fitting over the stud and disposed adjacent the smaller, or top, portion of the conical ledge, a member having a hole, said stud, beyond the rubber washer, extending through said hole in the member, said hole having a diameter nearly equal to the mean diameter of the conical ledge, said rubber washer having an outside diameter equal to or greater than the diameter of the base of the conical ledge.

3. In a support for a device, in combination, a base, a panel having an opening, a rubber-like annular member, having a thickness that is somewhat less than the thickness of the panel disposed in the opening, a stud fitting into the annular member and projecting beyond the outside faces of the panel, a rubber-like second annular member, having an outside diameter greater than the opening in the panel, disposed to fit on each of the projecting ends of the stud, two members each having the shape of a frustum of a cone mounted rigidly in relation to the stud disposed adjacent the outer faces of the second annular member, and means for rigidly connecting one of the projecting ends of the stud to said base.

4. In a support for a device, in combination, a base, a panel having an opening, a rubber-like annular member, having a thickness that is somewhat less than the thickness of the panel disposed in the opening, a stud fitting into the annular member and projecting beyond the outside faces of the panel, a rubber-like second annular member, having an outside diameter greater than the opening in the panel, disposed to fit on each of the projecting ends of the stud, two members each having the shape of a frustum of a cone mounted rigidly in relation to the stud with the point portions of their conical ends disposed adjacent the outer faces of the second annular member, means for rigidly connecting one of the projecting ends of the stud to said base, said point portions of the conical end compressing the second annular member axially and stretching it circumferentially upon any relative movement of the stud and panel.

5. A support for a device that is to be protected against impacts imparted to the base upon which the support is mounted, said support comprising, a stud, an intermediate self-damping resilient washer, two self-damping larger resilient washers disposed on each side of the intermediate washer, two dome-shaped rigid washers disposed at each side of the two resilient washers and having the tops of their domes adjacent the two resilient washers, all said washers being mounted on the stud, the two rigid washers being fixed longitudinally of the stud, a support disposed about the intermediate washer and adjacent the facing surfaces of the two resilient washers, said stud being fixed to the base, whereby any force moving the base will cause an out-of-proportion relative movement between support and base.

6. A support for a device that is to be protected against impacts imparted to the base upon which the support is mounted, in combination, a base that may at times be subjected to impacts, a device, a member upon which the device is rigidly mounted, a resilient connection between the base and member, said resilient connection comprising a stud rigidly connected to the base and projecting substantially at right angles to the base, a rigid conical-shaped washer disposed on the stud with the base of its cone against the base, a rubber washer snugly fitting on the stud disposed between the member and the top portion of the cone of the rigid washer, said stud beyond the rubber washer projecting through a hole in the member having a size greater than the thickness of the stud but lesser than the outside diameter of the washers, and means for holding the member in position against the rubber washer.

7. A support for a device that is to be protected against impacts imparted to the base upon which the support is mounted, in combination, a base that may at times be subjected to impacts, a device, a member upon which the device is rigidly mounted, a resilient connection between the base and member, said resilient connection comprising a stud rigidly connected to the base and projecting from the base, a rigid washer in the shape of a frustum of a cone, with the base portion thereof adjacent the base, disposed on the stud, a rubber-like relatively thick washer on the stud between the member and the top portion of the rigid washer, the stud being positioned through an opening larger in diameter than the stud, a panel, and means for holding the panel on the stud.

WALTER SCHAELCHLIN.